United States Patent
Cohn et al.

(10) Patent No.: US 10,372,767 B2
(45) Date of Patent: Aug. 6, 2019

(54) SENSOR BASED CONTEXT AUGMENTATION OF SEARCH QUERIES

(71) Applicant: INTERNATIONAL BUSINESS MACHINES CORPORATION, Armonk, NY (US)

(72) Inventors: John M. Cohn, Essex Junction, VT (US); Joseph N. Kozhaya, Research Triangle Park, NC (US); Veena S. Pureswaran, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/243,721

(22) Filed: Aug. 22, 2016

(65) Prior Publication Data

US 2018/0052925 A1 Feb. 22, 2018

(51) Int. Cl.
*G06F 17/30* (2006.01)
*G06F 16/951* (2019.01)
*G06F 16/2457* (2019.01)
*G06F 16/332* (2019.01)

(52) U.S. Cl.
CPC ...... *G06F 16/951* (2019.01); *G06F 16/24578* (2019.01); *G06F 16/3329* (2019.01)

(58) Field of Classification Search
CPC .......... G06F 17/30864; G06F 17/3053; G06N 7/005; G06N 99/005
USPC ....................................................... 707/723
See application file for complete search history.

(56) References Cited

U.S. PATENT DOCUMENTS

| | | | | |
|---|---|---|---|---|
| 7,437,349 | B2 * | 10/2008 | Basu | G06F 16/3338 |
| 8,275,810 | B2 | 9/2012 | Barton | |
| 8,375,048 | B1 * | 2/2013 | Wad | G06F 16/3338 |
| | | | | 707/767 |
| 8,983,926 | B2 | 3/2015 | Cai et al. | |
| 2007/0130112 | A1 | 6/2007 | Lin | |
| 2008/0005067 | A1 * | 1/2008 | Dumais | G06F 16/24575 |
| 2012/0078938 | A1 * | 3/2012 | Davis | G06F 16/3322 |
| | | | | 707/767 |
| 2013/0290305 | A1 | 10/2013 | Feng et al. | |
| 2014/0129584 | A1 * | 5/2014 | Maple | H04L 67/16 |
| | | | | 707/760 |
| 2014/0136187 | A1 * | 5/2014 | Wolverton | G10L 15/22 |
| | | | | 704/9 |

(Continued)

OTHER PUBLICATIONS

Schutte, K., Bomhof, F. & Burghouts, G. (2013). Semantic Search on Internet Connected Sensors. SPIE Proceedings, 8758.

(Continued)

*Primary Examiner* — Hosain T Alam
*Assistant Examiner* — Robert F May
(74) *Attorney, Agent, or Firm* — Conley Rose, P.C.

(57) ABSTRACT

A computing device and method is usable to augment search queries with data obtained from sensors. The computing device comprises a processor configured to receive, from a query source, a search query comprising a query concept. The processor is further configured to determine a context of the query concept expressed in the query. The processor is further configured to determine a response to the query. The processor is further configured to validate the context of the query using at least one sensor. The processor is further configured to transmit the response to the query to the query source.

18 Claims, 5 Drawing Sheets

(56) References Cited

U.S. PATENT DOCUMENTS

2015/0019342 A1* 1/2015 Gupta .................... G06Q 10/20
                                                    705/14.66
2015/0248462 A1   9/2015 Theeten et al.
2015/0310015 A1* 10/2015 Alexander .......... G06F 16/2336
                                                    707/748

OTHER PUBLICATIONS

Zhang, C., Cheng, C. & Ji, Y (2012). Architectural Design for Social Web of Things. Proceedings of the 1st International Workshop on Context Discovery and Data Mining.

Yitong, H., Xiaozheng, L. & Bingpie, B. (2013). Web-of-Things Framework for WeChat. Green Computing and Communications (GreenCom).

Mell, et al., "Computer Security," NIST Special Publication 800-145, the NIST Definition of Cloud Computing, Computer Security Division, Information Technology Laboratory, National Institute of Standards and Technology, Gaithersburg, MD 20899-8930, Sep. 2011, 7 p.

Perera, et al., "Context-aware Sensor Search, Selection and Ranking Model for Internet of Things Middleware," Proceedings of the IEEE 14th International Conference on Mobile Data Managment (MDM), arXiv:1303.2447v1 [cs.NI], Mar. 11, 2013, 9 pages.

Office Action dated Jul. 10, 2018, 20 pages, U.S. Appl. No. 15/243,729, filed Aug. 2, 2016.

* cited by examiner

500

| Intent | Concept List | Pressure Sensor | Engine Sensor | Weather Sensor | GPS Sensor |
|--------|--------------|-----------------|---------------|----------------|------------|
| fix | Tire, pressure | 4 | 1 | 3 | 1 |

*FIG. 5*

SENSOR BASED CONTEXT AUGMENTATION OF SEARCH QUERIES

STATEMENT REGARDING FEDERALLY SPONSORED RESEARCH OR DEVELOPMENT

Not applicable.

STATEMENT REGARDING PRIOR DISCLOSURES BY THE INVENTOR OR A JOINT INVENTOR

Not applicable.

BACKGROUND

The present disclosure relates to the field of search query processing, and more specifically, to processing search queries using data from sensors.

Search queries enable users of computing devices to perform searches of one or more sources, for example, Internet or network accessible databases, for desired information. The desired information is identified by a search query provided to the computing device by the user. Search queries may take numerous forms, such as a list of disjointed words, a combination of search terms and logical or spatial operators (e.g., "terms and connectors"), or a natural language search query. Natural language search queries enable the user to provide the search query in a form similar in nature to conversational communication, which in some circumstances may have inherent complexities. As such, it may be desirable to augment natural language search queries with additional data to compensate for the inherent complexities of the natural language search queries.

SUMMARY

In one embodiment, a computer program product for sensor augmented searching. The computer program product comprises a computer readable storage medium having program instructions embodied therewith, the program instructions executable by a processor. Executing the instructions causes the processor to receive, from a query source, a search query comprising a query concept. Executing the instructions further causes the processor to determine a context of the query concept expressed in the query. Executing the instructions further causes the processor to determine a response to the query. Executing the instructions further causes the processor to validate the context of the query using at least one sensor. Executing the instructions further causes the processor to transmit the response to the query to the query source.

In another embodiment, a computer-implemented method that includes various embodiments that are executable by a computing device. The method comprises receiving a search query. The method further includes determining a context of the search query. The method further includes determining one or more sensor classes that effect an information gain by providing additional context to the search query. The method further includes determining a response to the search query based on the additional context. The method further includes transmitting the response to the search query to a user-equipment associated with a source of the search query such that the transmission of the response to the search query enables the user-equipment associated with the source of the search query to present the response to the search query via one or more interfaces.

In another embodiment, a system capable of learning, comprising a processor operable to execute instructions. The processor is configured to receive a natural language search query from a query source. The processor is further configured to determine an intent of the query and concepts having a relationship to the intent. The processor is further configured to determine a response to the query based on the intent of the query and the concepts having the relationship to the intent, the response having a first associated confidence score. The processor is further configured to transmit the response to the query source when the first confidence score exceeds a threshold. The processor is further configured to augment the query with first sensor data to form an enhanced query when the first confidence score does not exceed the threshold. The processor is further configured to determine a response to the enhanced query, the response having a second associated confidence score. The processor is further configured to transmit the response to the enhanced query to the query source when the second confidence score exceeds the threshold.

BRIEF DESCRIPTION OF THE DRAWINGS

FIG. 5 depicts a table of sensor relevance according to an embodiment of the present disclosure.

DETAILED DESCRIPTION

Disclosed herein are embodiments that provide for augmentation of search queries using data obtained from sensors. The search queries may be, for example, natural language search queries formulated in a manner similar to a natural speech pattern or conversational speaking format of a user who creates the search queries. The sensors may be, in some embodiments, sensors within the Internet of Things (IoT). The IoT describes a network of physical items (e.g., structures, vehicles, and other devices) embedded with electronic components such as sensors and/or communications components that enable the physical items to generate, collect, and/or communicate data. For example, a sensor within the IoT may be embedded in a vehicle tire or supporting structure such that the sensor collects a value of an air pressure within the tire and communicates that value to a computing device within a vehicle coupled to the tire and/or a computing device external to the vehicle. The search queries may be augmented with the data obtained from the sensors by determining a context of the search queries, and determining a corresponding sensor that has a relationship to the context of the search queries and provides an information gain to the search query. The relationship of the sensor to the context of the search queries may be determined according to a table of training data that associates sensors and/or classes of sensors (e.g., groups of sensors, grouped according to similar functionality, physical location, and/or other logical groupings) with the contexts of the search queries. The training data may be initially programmed according to user input associating a particular search context with a particular sensor, and may be updated periodically as additional information becomes available (e.g., when application of sensor data improves or deteriorates a response to a search query).

Figure 1:
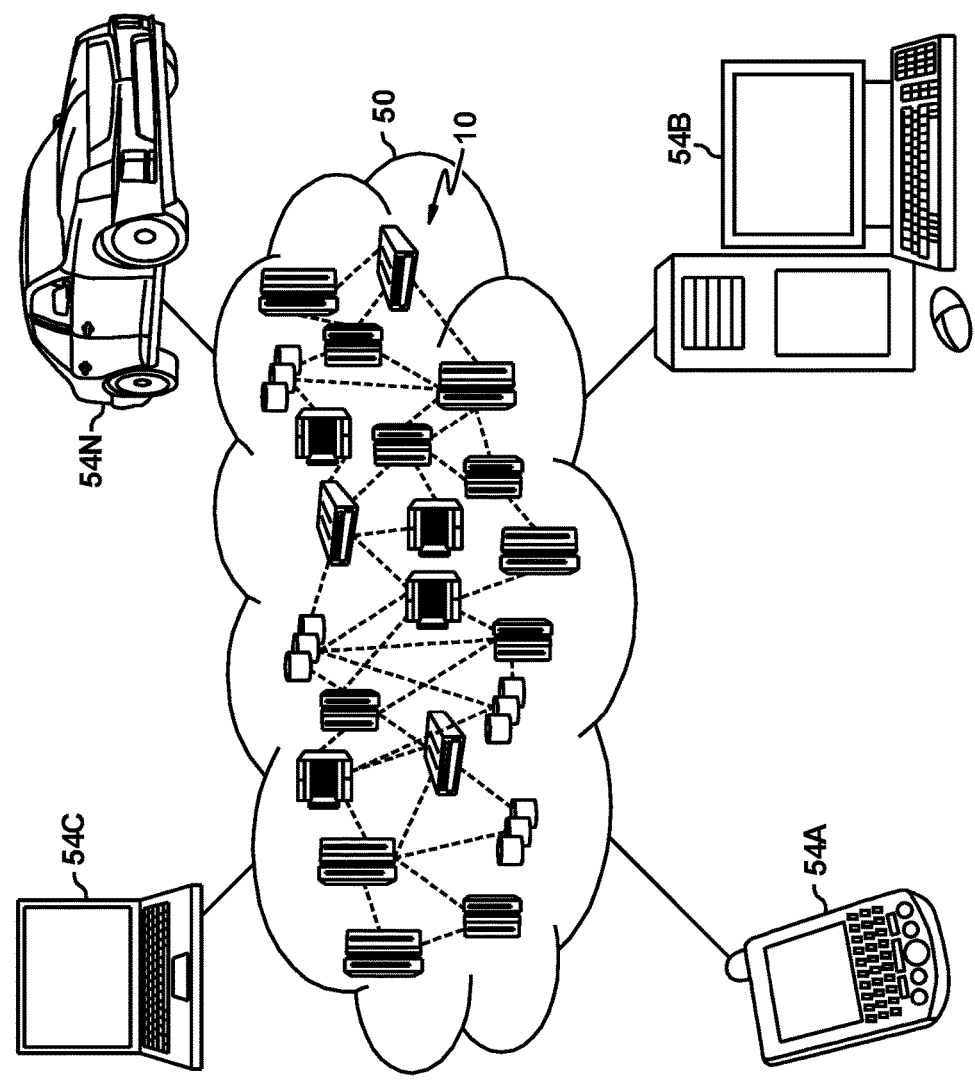
FIG. 1 depicts a cloud computing environment according to an embodiment of the present disclosure.
Figure 2:
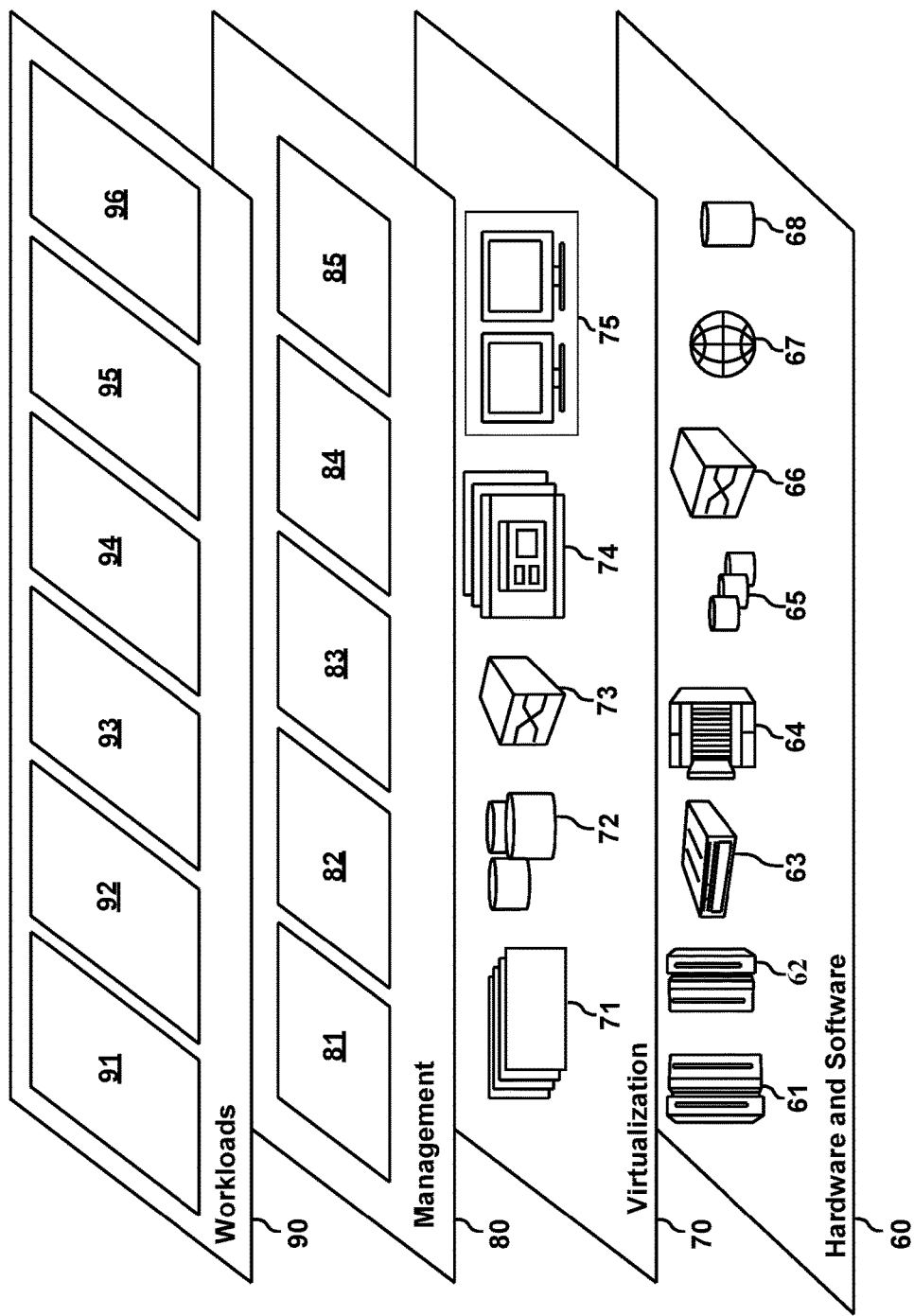
FIG. 2 depicts abstraction model layers according to an embodiment of the present disclosure.

Turning now to FIGS. 1 and 2, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, PDA or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The hardware and software components of hardware and software layer 60 may serve as the underlying computing components on which cloud computing functions are executed in response to receipt of a request for performance of a function and/or service offered as a part of cloud computing environment 50 such as, for example, the search query processing described below.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. These virtual entities may enable a subscriber to cloud computing environment 50 to interact indirectly with the hardware and software components of hardware and software layer 60 indirectly via virtual layer 70 without having a specific knowledge of, or interacting directly with, hardware and software layer 60. For example, a plurality of subscribers may interact with virtualization layer 70 to respectively access a corresponding plurality of virtual servers 71 and virtual storage 72 that all exist as separate threads, instances, partitions, etc. on a single server 62 and storage device 65, respectively. In such a scenario, virtualization layer 70 may cause each virtual server 71 and virtual storage 72 to appear to each subscriber as a dedicated and seamless computing and storage device, while enabling efficient operation of the hardware and software components of hardware and software layer 60 by reducing a potential for redundancy of components.

In one example, management layer 80 may provide the functions described below via an abstraction layer such that a subscriber to cloud computing environment 50 may interact with virtualization layer 70 and/or hardware and software layer 60 indirectly via management layer 80 without having a specific knowledge of, or interacting directly with, virtualization layer 70 and/or hardware and software layer 60. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 50 to interact with cloud computing environment 50 through management layer 80 to perform tasks and functions (e.g., administrative tasks) separate from actual execution of functions in the cloud computing environment 50. For example, an administrator may request access to a certain amount of computing resources (e.g., as provided in virtualization layer 70 and/or hardware and software layer 60) in cloud computing environment 50 via management layer 80 without having a specific knowledge of, or interacting directly with, virtualization layer 70 and/or hardware and software layer 60.

Workloads layer 90 provides examples of functionality for which the cloud computing environment may be utilized. The workloads and functions illustrated in workloads layer 90 are merely exemplary workloads and functions that may be executed in cloud computing environment 50 at the request or direction of a subscriber to cloud computing environment 50, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and search query processing 96. These workloads and functions of workloads layer 90 may be end-user applications that enable a subscriber to cloud computing infrastructure 50 to interact with any of management layer 80, virtualization layer 70, and/or hardware and software layer 60 indirectly via workloads layer 90 without having a specific knowledge of, or interacting directly with, any of management layer 80, virtualization layer 70, and/or hardware and software layer 60. In this manner, the subscriber and/or an end user who accesses cloud computing infrastructure 50 may not require any form of specialized knowledge relating to the composition or operation of any of management layer 80, virtualization layer 70, and/or hardware and software layer 60 to perform the workloads and functions of workloads layer 90. In such a scenario, the workloads and functions of workloads layer 90 are said to be abstracted from management layer 80, virtualization layer 70, and hardware and software layer 60 because workloads layer 90 hides the underlying operation of management layer 80, virtualization layer 70, and hardware and software layer 60 from the subscriber and/or end-user while still enabling the subscriber and/or end-user to indirectly interact with management layer 80, virtualization layer 70, and/or hardware and software layer 60 to receive the computer processing benefits thereof via workloads layer 90.

Figure 3:
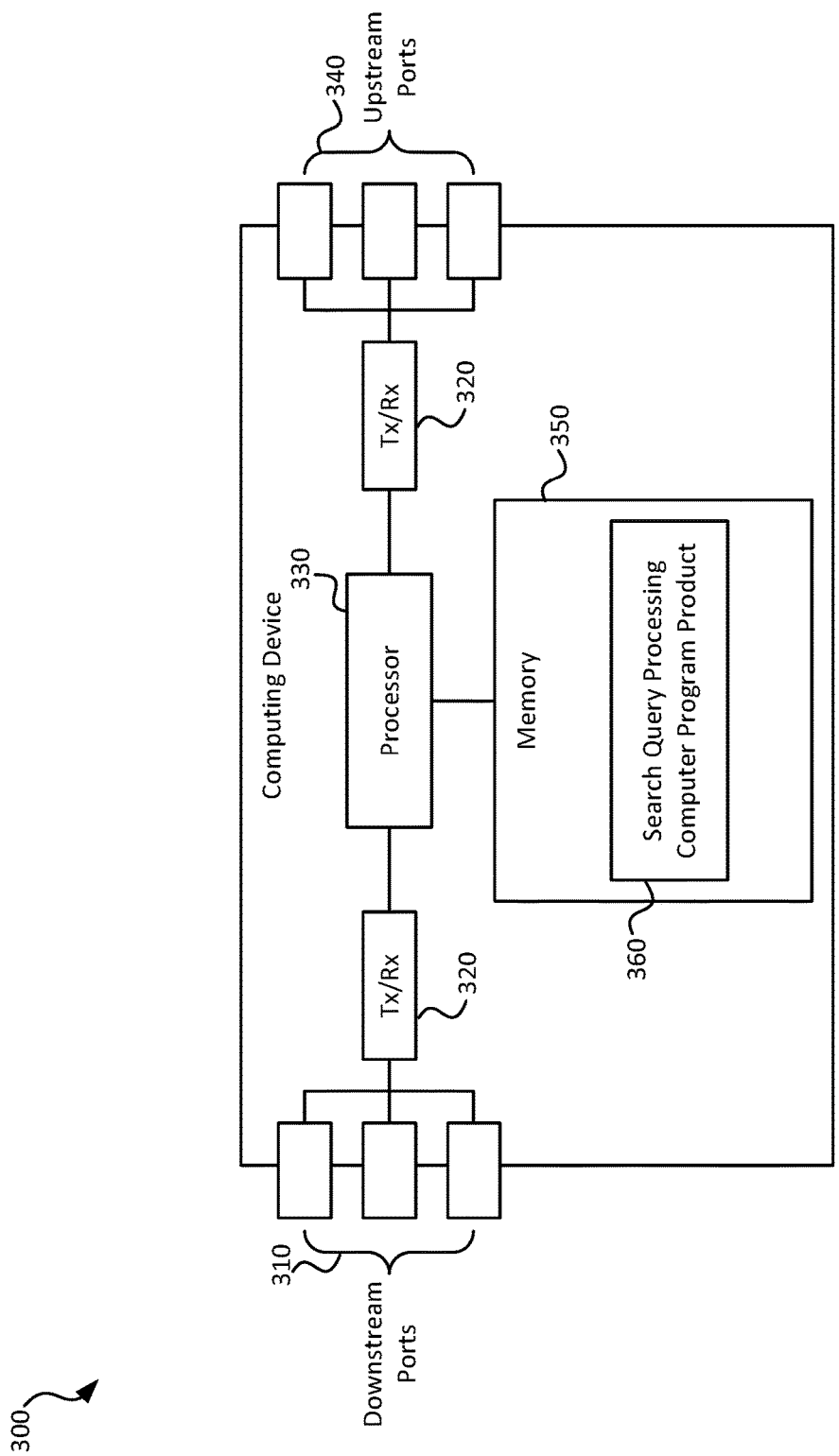
FIG. 3 depicts a computing device according to an embodiment of the present disclosure.

With reference now to FIG. 3, a schematic diagram of a computing device 300 according to an embodiment of the present disclosure is shown. Computing device 300 may be a PDA or cellular telephone 54A, a desktop computer 54B, a laptop computer 54C, automobile computer system 54N, or other suitable processing device capable of performing the functions disclosed herein such as a computer system, a server, a cloud computing node, or may be generally representative of a distributed computing device in which one or more components of computing device 300 are distributed or shared across one or more devices. Computing device 300 is configured to implement at least some of the features/methods disclosed herein, for example, the search query processing of method 400, discussed below. In various embodiments, for instance, the features/methods of this disclosure are implemented using hardware, firmware, and/or software installed to run on hardware.

Computing device 300 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the computing device 300 is an apparatus and/or system configured to implement the search query processing of method 400, for example according to a computer program product.

The computing device 300 comprises one or more downstream ports 310 coupled to a transceiver (Tx/Rx) 320, which are transmitters, receivers, or combinations thereof. The Tx/Rx 320 transmits and/or receives frames from other computing devices via the downstream ports 310. Similarly, the computing device 300 comprises another Tx/Rx 320 coupled to a plurality of upstream ports 340, wherein the Tx/Rx 320 transmits and/or receives frames from other nodes via the upstream ports 340. The downstream ports 310 and/or the upstream ports 340 may include electrical and/or optical transmitting and/or receiving components. In another embodiment, the computing device 300 comprises one or more antennas (not shown) coupled to the Tx/Rx 320. The Tx/Rx 320 transmits and/or receives data (e.g., packets) from other computing or storage devices wirelessly via the one or more antennas.

A processor 330 is coupled to the Tx/Rx 320 and is configured to process a received search query, for example, at least in part according to data received from one or more sensors. In an embodiment, the processor 330 comprises one or more multi-core processors and/or memory modules 350, which functions as data stores, buffers, etc. The processor 330 is implemented as a general processor or as part of one or more application specific integrated circuits (ASICs), field-programmable gate arrays (FPGAs), and/or digital signal processors (DSPs). Although illustrated as a single processor, the processor 330 is not so limited and alternatively comprises multiple processors. The processor 330 further comprises a search query processing computer program product 360 that is configured to process received search queries.

FIG. 3 also illustrates that a memory module 350 is coupled to the processor 330 and is a non-transitory medium configured to store various types of data. Memory module 350 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the various embodiments described herein. For example, alternatively, the memory module 350 may comprise the search query processing computer program product 360, which is executed according to instructions from processor 330.

It is understood that by programming and/or loading executable instructions onto the computing device 300, at least one of the processor 330 and/or the memory module 350 are changed, transforming the computing device 300 in part into a particular machine or apparatus, for example, a search query processing device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
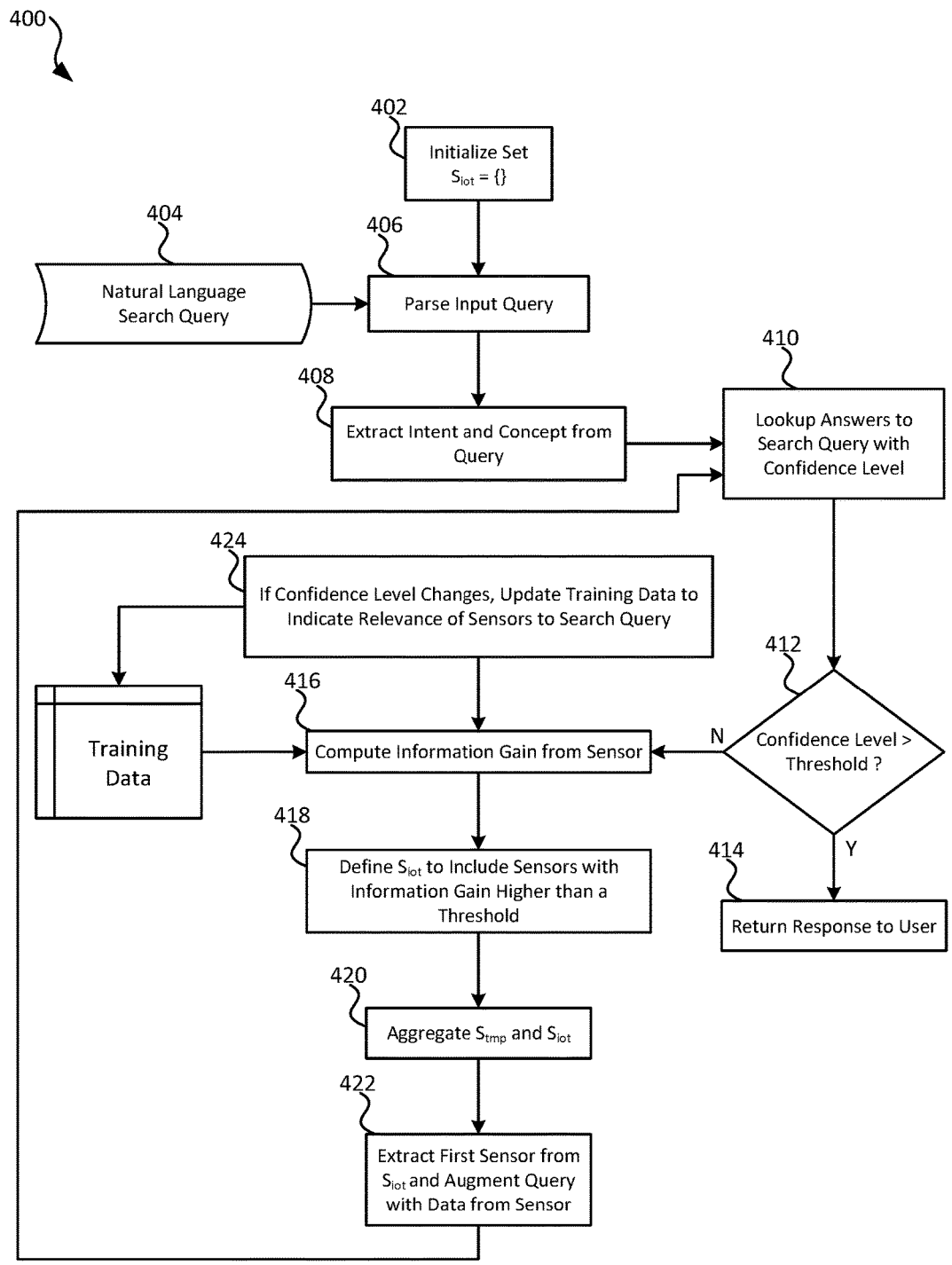
FIG. 4 depicts a flowchart of a method for processing a search query according to an embodiment of the present disclosure.

Turning now to FIG. 4, a flowchart of a method 400 for processing a search query according to an embodiment of the present disclosure is shown. Method 400 is a computer-implemented method, implemented by a computing device such as computing device 300, to process a search query, optionally based at least in part on sensor data related to the search query. It should be understood that while method 400 is illustrated and described with reference to the following blocks, one or more of the following blocks of method 400 may be omitted and/or combined with any one or more other blocks of method 400. Further, the following blocks of method 400 may be implemented in any order and are not to be limited based on an order of discussion presented herein.

At block 402, the computing device initializes a set of sensor classes ($S_{iot}$) to be empty (e.g., cleared) such that sensor classes and/or sensors from processing a prior search query are cleared prior to beginning processing of a new search query. At input block 404, the computing device receives a search query from a user. The search query may be, for example, a natural language search query formulated according to a natural speech pattern, or may be formulated according to any other suitable forms. The computing device may receive the search query from the user directly, for example, input by the user into the computing device through an interface such as a keyboard attached to the computing device, or may receive the search query from the user indirectly, for example, via network communication in an environment such as the cloud computing environment, described above.

At block 406, the computing device parses the search query. Parsing the search query divides the search query into one or more two-word pairs that may be referred to as tokens and may identify one or more subjects and one or more associated verbs of the search query. For example, one or more tokens determined at block 406 may be subject-verb pairs. Parsing the search query at block 406 may convert the search query into a format more easily processed by a computing device to determine a response to the search query.

At block 408, the computing device extracts one or more intents and one or more concepts from the search query to determine characteristics of the search query for use in determining a response to the search query. In one embodiment, the intents may each represent a desired activity or outcome, and the concepts may provide meaningful information related to the intents. For example, for an exemplary search query of "Tire pressure sensor is on, how can I fix it," an intent of the query may be identified as "fix" and concepts of the search query corresponding to the intent may be identified as "tire" and "pressure." In some embodiments, the intents and concepts extracted at block 408 may further identify a context of the search query.

At block 410, using the intents and concepts and the context of the search query, the computing device determines a response to the search query. The response to the search query determined at block 410 may, in some embodiments, be referred to as a preliminary or initial response that is verified as a correct response before it is provided to the user as a final or actual response to the search query received at block 404. To verify whether the determined response to the search query is a correct response, a confidence level is associated with the response to the search query. The confidence level may be determined by any suitable means which are not limited herein, and may be determined by the computing device or may be determined by another device and transmitted to the computing device.

At decision block 412, the computing device performs a comparison between the confidence level of the response to the search query determined at block 410 and a threshold confidence level. The threshold confidence level may be a static value that is present in the computing device for execution of the method 400, or may by a dynamically adjustable value that may be changed according to particular search queries or user-provided parameters. When the confidence level of the response to the search query determined at block 410 exceeds the threshold confidence level, at block 414 the computing device returns the response to the search query to the user from which the computing device received the search query at block 404. The computing device may return the response to the search query by, for example, transmitting the response to the search query to a user equipment associated with the user from which the computing device received the search query at block 404. Returning to the previous exemplary search query of "Tire pressure sensor is on, how can I fix it," a response to the search query may have a confidence level that is less than the threshold confidence level because the computing device may have limited or no knowledge of contextual information surrounding the search query. In such a scenario, the computing device may seek to increase an available amount of contextual information related to the search query so that the confidence level of a response to a search query that includes additional contextual information may exceed the threshold confidence level.

When a response to the search query is not determined with a sufficient confidence level at block 410, the computing device may augment or enhance the search query with data from one or more sensors. Returning to the previous exemplary search query of "Tire pressure sensor is on, how can I fix it," one or more sensors such as pressure sensors, weather sensors, or position sensors (e.g., global position satellite (GPS) sensors) may be relevant to the search query. Any one or more of these sensors may provide data that effects an information gain on the search query, resulting in the augmented or enhanced search query for which a determined response may have a confidence level that exceeds the threshold confidence level. For example, such an augmentation of the search query may result in a response from the computing device that indicates that the tire pressure sensor is on because of a normal fluctuation in tire pressure given recent weather changes and that no action is necessary on the part of the user from which the search query was received, thereby providing the user from which the search query was received with a higher confidence response to the search query. Alternatively, the augmentation of the search query may result in a response that indicates to the user that, based on the additional context provided through the one or more sensors, that the user's tire pressure is indeed irregular (e.g., based on a database of irregular tire pressure measurements) and may identify one or more possible resolutions to the irregularity in tire pressure and/or identify one or more repair locations proximate to the user.

It should be noted that although the present discussion occurs with reference to sensors (e.g., individual sensors that may each have a limited scope of operation or singular focus), in some embodiments the sensors may be grouped by any suitable means into sensor classes, each containing one or more sensors. In these embodiments, such sensor classes may provide a convenient means for sorting and filtering sensors, for example, when a large number of sensors are available. As an example, in an embodiment in which the computing device has access to many sensors (e.g., hundreds of sensors, thousands of sensors, or millions of sensors), the sensors may be grouped into sensor classes of sensors that are related based on function, location, or any other suitable logical or physical differentiating characteristics. Such groupings may enable the computing device to more rapidly identify irrelevant and/or potentially relevant sensor data by initially excluding or including entire sensor classes in processing functions, thereby minimizing an expenditure of processing resources by the computing device when each sensor contained within an irrelevant sensor class is not individually processed. As such, any processing discussed as involving or determining any one or more sensors may be equally applicable and interchangeable with any one or more sensor classes.

At block 416, the computing device determines or computes an amount of information gain for one or more sensors. The amount of information gain may be determined according to any suitable means and is not limited herein. In some embodiments, the computing device determines the information gain according to a table of training data that is accessible by the computing device (e.g., stored in one or more non-transitory computer-readable storage mediums that are coupled to, or accessible by, the computing device). The training data may be embodied in a table that associates a level of relevance of particular sensors to particular intents, concepts, and/or contexts. For example, the computing device may determine an information gain for a sensor based on a relevance score for that sensor as it relates to the search query. Generally, a sensor that is indicated as having a high relevance may correspondingly have a high information gain.

Turning for a moment to FIG. 5, a table 500 of sensor relevance according to an embodiment of the present disclosure and corresponding to the previous exemplary search query of "Tire pressure sensor is on, how can I fix it" is shown. As illustrated in table 500, each sensor available to the computing device receives a relevance score for the intent of "fix" and the concepts of "tire" and "pressure." It should be noted that while only four sensors are shown in the example of table 500, any number of sensors and/or sensor classes may be associated with an intent and concept entry in table 500. Further, it should be noted that although relevance scores ranging from one to four are illustrated in table 500, any suitable range providing a desired degree of granularity may be used.

As shown in table 500, for a search query having the intent of "fix" and the concepts of "tire" and "pressure," table 500 may indicate a tire pressure sensor as having a high degree of relevance, indicated by a relevance score of four, to the search query. As further indicated by table 500, a weather sensor may have also have a high degree of relevance, indicated by a relevance score of three, to the search query. Additional sensors available to the computing device, such as an engine sensor and a GPS sensor, may have a low degree of relevance, indicated by a relevance score of one, to the search query. However, in various embodiments a sensor that is initially indicated as having a low degree of relevance to the search query may be determined, through method 400, to bear a greater relevance to the search query than initially indicated. For example, in the above example of tire air pressure, a relationship between geographic location and weather may be known to the computing device. As such, a high degree of relevance for a weather sensor may indicate a desirability to consider GPS sensor data despite the initially indicated degree of relevance of the GPS sensor being a low degree of relevance.

In some embodiments, table 500 may be modified by the computing device through execution of method 400 by adding, removing, or changing information contained within or indicated by table 500. In addition, table 500 may undergo a training process by which a user manually indicates a relevance of one or more sensors to intents and concepts of search queries to provide the computing device with a ground truth. The training process may occur only once, may occur periodically at a given time interval, and/or may occur aperiodically in an as-needed fashion when desired or deemed necessary by the user. For example, if table 500 consistently indicates an initially low degree of relevance for a sensor that is later determined to have a high degree of relevance, consistently indicates an initially high degree of relevance for a sensor that is later determined to have a low degree of relevance, or does not indicate any sensor having an initially high degree of relevance, it may be desirable to perform the training process to modify the relevance scores of table 500.

Returning now to FIG. 4, at block 418 the computing device defines a temporary set of sensor classes ($S_{tmp}$) to include sensors determined at step 416 to have an information gain that exceeds a desired threshold. The threshold may be a static value that is present in the computing device for execution of the method 400, or may be a dynamically adjustable value that may be changed according to particular search queries. A particular value for the threshold may be a matter of design choice that is determined to, for example, optimize a usage of resources in the computing device's execution of method 400 by only considering sensors that have a high level of relevance to the search query.

At block 420, the computing device aggregates the set of sensor classes $S_{tmp}$ with $S_{iot}$ to form a set of sensor classes that provide an information gain that exceeds the threshold. In some embodiments, method 400 may comprise an iterative loop or process beginning with block 410. In such embodiments, $S_{iot}$ may be refined over multiple executions of method 400 to provide a highest level of information gain available from the sensors that are available to the computing device until a response to the search query having a confidence level that exceeds the threshold is determined. On a first execution of block 420, the set of sensor classes $S_{tmp}$ may be aggregated with $S_{iot}$ without further action by the computing device. In subsequent executions of block 420 during the iterative loop of method 400, when $S_{tmp}$ is aggregated with $S_{iot}$, sensor classes previously present in $S_{iot}$ that are again present in $S_{tmp}$ may be assigned a greater value in $S_{iot}$ than in previous executions of block 420. For example, in a first execution of block 420, $S_{tmp}$ may include a tire pressure sensor and a weather sensor and may be aggregated with $S_{iot}$. In a second execution of block 420, $S_{tmp}$ may again include the tire pressure sensor and may include a GPS sensor. In the second execution of block 420, the tire pressure sensor may receive a greater value within $S_{iot}$ when $S_{tmp}$ is aggregated with $S_{iot}$ because the tire pressure sensor has been identified as having an information gain above the threshold in multiple iterative loops of method 400. Correspondingly, in some embodiments, the weather sensor present in $S_{iot}$ from the first execution of block 420 may receive a decreased value within $S_{iot}$ because the weather sensor was identified only in the first execution of block 420, but not the second execution of block 420.

At block 422, the computing device determines a highest rated sensor from within the set of sensor classes $S_{iot}$ to augment the search query with data associated with the highest rated sensor. In some embodiments, determining the highest rated sensor may comprise, for example, the computing device extracting a first or top-most sensor from a ranked order of sensors within the set of sensor classes $S_{iot}$. After the computing device determines the highest rated sensor, the computing device may request and/or receive data from the highest rated sensor. The computing device may use the data from the highest rated sensor to augment, modify, and/or enhance the search query with context information derived from the data from the highest rated sensor.

After augmenting the search query with the data from the highest rated sensor, method 400 returns to block 410 to repeat the iterative process of determining a response to the augmented, modified, and/or enhanced search query according to one or more sensors available to the computing device that provide contextual information that effects an information gain on the search query. When a highest rated sensor identifies and/or includes contextual information not previously identified by the computing device for the search query, the highest rated sensor may be said to provide additional context to the search query. Alternatively, when the highest rated sensor is consistent with contextual information previously identified by the computing device for the search query, the highest rated sensor may be referred to as verifying and/or validating the context of the search query as may be determined at block 408.

In some embodiments, method 400 is further operable to update, modify, store, and/or refine training data from which the computing device determines the information gain effected by the one or more sensors, for example, as described above with respect to block 416. For example, on a second and subsequent executions of block 410 during the iterative process of method 400, at block 424 the computing device determines whether a confidence level of the response determined at block 410 has changed. When the confidence level has changed (e.g., as a result of the inclusion and/or exclusion of data from a sensor used to augment the search query), the computing device determines whether the confidence level has increased or decreased. Based on whether the confidence level has increased or decreased, the computing device updates training data associated with the sensor (e.g., as stored in table 500, discussed above) to reflect the sensor's observed relevance and/or information gain or decrease with respect to the search query. In this manner, block 424 may facilitate a self-learning process within the method 400 such that the training data from which the information gain effected by the sensors available to the computing device is determined is refined with each execution of the iterative loop of method 400.

As the computing device refines the training data with each iterative loop of method 400 the training data becomes a more robust data set that reflects relationships between sensors and search query concepts and intents based on search queries processed by the computing device via method 400. For example, the computing device may determine after a plurality of occurrences of the iterative loop of method 400 that a sensor that the computing device did not initially identify as highly relevant to intents and concepts of a search query may in fact have a significant relevance to that search query and/or those intents and concepts. The computing device may then alter the training data to reflect such a relevance so that the computing device identifies the sensor as highly relevant to the search query and/or that combination of intents and concepts with fewer executions of the iterative loop of method 400 than would occur to achieve the same result prior to the refinement of the training data.

Conversely, the computing device may determine after a plurality of occurrences of the iterative loop of method 400 that a sensor that the computing device initially identified as highly relevant to intents and concepts of a search query may not have a significant relevance to that search query and/or those intents and concepts. The computing device may then alter the training data to reflect such a lack of relevance so that the computing device does not identify the sensor as highly relevant to the search query and/or that combination of intents and concepts in future executions of method 400. Such an alteration or refinement enables the computing device to more efficiently determine which sensors available to the computing device are highly relevant to a search query and/or intents and concepts without utilizing processing time and computational capacity in evaluating a sensor that does not is not highly relevant to the search query, (e.g., as would occur prior to, or in the absence of, the refinement of the training data).

In this manner, refinement of the training data through the iterative loop of method 400 may result in more effective and/or efficient identification of sensors having a relevance to the search query, and/or fewer executions of the iterative loop of method 400 prior to a response to an augmented search query being determined with a confidence level that exceeds the threshold confidence level. Such an improvement in effectiveness and/or efficiency improves a quality of responses to search queries (e.g., natural language search queries) by more accurately identifying sensors that have a relevance to the search queries and/or improving an amount of time that elapses from submission of a search query by a user to delivery of a response to the search query to the user by more rapidly identifying sensors that have a relevance to the search queries. Furthermore, refining the training data enables the computing device to utilize information gained during execution of method 400 in processing of a first search query to augment a second and subsequent search queries during subsequent and/or future executions of method 400.

In some embodiments, the computing device may provide search query processing services, such as execution of method 400, to subscribers as a software as a service offering. In such embodiments, the subscribers may pay a fee for accessing the search query processing services, and in return have an ability to submit search queries for search query processing and receive responses to the search in an on-demand manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for sensor augmented searching, the computer program product comprising a non-transitory computer readable storage medium having program instructions embodied therewith, the program instructions executable by a processor to cause the processor to:
    receive, from a query source, a search query comprising a query concept;
    determine a context of the search query concept expressed in the search query;
    determine a response to the search query;
    determine a confidence level corresponding to the response to the search query;
    transmit the response to the search query to the query source when the confidence level is greater than a confidence threshold;
    determine an information gain for a plurality of sensors with respect to the search query when the confidence level is not greater than the confidence threshold by evaluating a table of sensor data that equates query concepts to the information gain provided by each of the plurality of sensors for each respective query concept of the query concepts;
    augment the search query with sensor data from a sensor from among the plurality of sensors to form an enhanced search query when the confidence level is not greater than the confidence threshold, the information gain of the sensor being greater than the information gain of a remainder of the plurality of sensors and exceeding an information gain threshold;
    determine a response to the enhanced search query; and
    transmit the response to the enhanced search query to the query source when the confidence level is greater than the confidence threshold.

2. The computer program product of claim 1, wherein the search query is a natural language search query.

3. The computer program product of claim 2, wherein the at least one sensor is an Internet of things sensor configured to allow use to enhance search queries.

4. The computer program product of claim 1, wherein determining the information gain for the plurality of sensors with respect to the search query comprises:
    determining whether sensor data from the at least one sensor increases the confidence level; and
    determining that the sensor data from the at least one sensor validates the context of the search query when the sensor data from the at least one sensor does not change the confidence level.

5. The computer program product of claim 4, wherein determining the information gain for the plurality of sensors with respect to the search query further comprises:
    determining that the sensor data from the at least one sensor does not validate the context of the search query when the sensor data from the at least one sensor increases the confidence level; and
    determining that the sensor data from the at least one sensor does not validate the context of the search query when the sensor data from the at least one sensor decreases the confidence level.

6. The computer program product of claim 1, wherein the at least one sensor is a member of a sensor class of the plurality of sensors that comprises a plurality of related sensors.

7. The computer program product of claim 1, wherein the computer program product is provided in a cloud environment as software as a service to a user who generates the search query.

8. A computer-implemented method, comprising:
receiving a search query;
determining a context of the search query;
determining one or more sensor classes that effect an information gain by providing additional context to the search query by evaluating a table of sensor data that equates search query contexts to the information gain provided by each of the one or more sensor classes for each respective search query context of the search query contexts;
identifying at least one sensor from among a group of sensors indicated by one of the one or more sensor classes, where the at least one sensor provides a greater information gain than sensors of at least some other sensors of the group of sensors and exceeds an information gain threshold;
reading sensor data from the at least one sensor;
augmenting the search query with at least a portion of the sensor data to form an enhanced search query;
determining a response to the enhanced search query;
determining that the response to the enhanced search query has a confidence level not greater than a confidence level threshold;
reading second sensor data from at least a second sensor when the confidence level of the response to the enhanced search query is not greater than the confidence level threshold;
augmenting the enhanced search query with at least a portion of the second sensor data to form a second enhanced search query when the confidence level of the response to the enhanced search query is not greater than the confidence level threshold;
determining a response to the second enhanced search query;
determining that the response to the second enhanced search query has a confidence level greater than the confidence level threshold; and
transmitting the response to the second enhanced search query to a user-equipment associated with a source of the search query such that the transmission of the response to the second enhanced search query enables the user-equipment associated with the source of the search query to present the response to the search query via one or more interfaces.

9. The computer-implemented method of claim 8, wherein the table of sensor data indicates a relevance of one or more sensors belonging to the one or more sensor classes to the context of the search query.

10. The computer-implemented method of claim 8, wherein the computer-implemented method is implemented in a cloud environment as an on-demand service.

11. The computer-implemented method of claim 8, wherein each of the one or more sensor classes comprises one or more sensors having a relationship to each of the other one or more sensors within a same sensor class.

12. The computer-implemented method of claim 8, further comprising validating the context of the search query according to at least one sensor of the one or more sensor classes.

13. A system capable of learning, comprising a processor configured to:
receive a natural language query from a query source;
determine an intent of the query and concepts having a relationship to the intent;
determine a response to the query based on the intent of the query and the concepts having the relationship to the intent, the response having a first associated confidence score;
transmit the response to the query source when the first confidence score exceeds a threshold;
augment the query with first sensor data to form an enhanced query when the first confidence score does not exceed the threshold;
determine a response to the enhanced query, the response having a second associated confidence score;
augment the enhanced query with second sensor data to form a second enhanced query when the second confidence score does not exceed the threshold and the second sensor data is determined to provide an information gain over the first sensor data by evaluating a table of sensor data that equates the intent of the query and the concepts having the relationship to the intent to the information gain provided by each of a plurality of sensors including at least a second sensor that generates the second sensor data;
determine a response to the second enhanced query, the response having a third associated confidence score; and
transmit the response to the second enhanced query to the query source when the third confidence score exceeds the threshold.

14. The system of claim 13, wherein the processor is further configured to:
retrieve the first sensor data from a first sensor when the first sensor is included in a class of sensors that provides an information gain to the query and an information gain of the first sensor exceeds an information gain threshold; and
retrieve the second sensor data from the second sensor when the second sensor is included in the class of sensors that provides the information gain to the query and an information gain of the second sensor exceeds the information gain threshold.

15. The system of claim 14, wherein the first sensor and the second sensor are selected at least partially according to the table of sensor data, wherein the table of sensor data is associated with a predicted information gain for at least one of the intent of the query or the concepts having the relationship to the query.

16. The system of claim 15, wherein the table of sensor data is formed according to training data that indicates an effect of data from a given sensor on a confidence score of a search query.

17. The system of claim 13, wherein the processor is further configured to:
determine a query context corresponding to the intent of the query and the concepts having the relationship to the intent; and
determine at least one sensor class comprising at least one sensor that validates the determined query context according to at least one sensor data of the at least one sensor.

18. The computer program product of claim 1, wherein executing the program instructions further causes the processor to:

determine a second confidence level corresponding to the response to the enhanced search query;

determine a second information gain for the plurality of sensors with respect to the enhanced search query when the second confidence level is less than the confidence threshold;

augment the enhanced search query with sensor data from a second sensor from among the plurality of sensors to form a second enhanced search query when the second confidence level is less than the confidence threshold, the second information gain of the second sensor exceeding the information gain threshold;

determine a response to the second enhanced search query; and transmit the response to the second enhanced search query to the query source when the second confidence level is not greater than the confidence threshold.

* * * * *